United States Patent [19]

Racke

[11] 4,280,254

[45] Jul. 28, 1981

[54] BELT RETENTION MEANS FOR GARMENTS

[76] Inventor: Joseph Racke, 120, Edgware Way, Edgware, Middlesex, England

[21] Appl. No.: 105,146

[22] Filed: Dec. 19, 1979

Related U.S. Application Data

[63] Continuation of Ser. No. 908,771, May 23, 1978, abandoned.

[30] Foreign Application Priority Data

May 24, 1977 [GB] United Kingdom ............... 21909/77
Jun. 20, 1977 [GB] United Kingdom ............... 25615/77

[51] Int. Cl.³ ............................................. A44B 11/00
[52] U.S. Cl. ..................... 24/336; 24/163 K; 24/182
[58] Field of Search ............... 241/182, 79, 35, 163 K, 241/49 A, 49 K; 40/1-6, 1.5

[56] References Cited

U.S. PATENT DOCUMENTS

| 679,542 | 7/1901 | Peats ........................................ 24/79 |
| 800,937 | 10/1905 | Parkes ..................................... 24/79 |
| 804,905 | 11/1905 | Weaver, Jr. ............................. 24/79 |
| 2,495,029 | 1/1950 | Spengler ............................ 24/182 X |
| 2,795,876 | 6/1957 | Hayes ...................................... 40/1.5 |
| 2,856,666 | 10/1958 | Crothers ........................... 24/182 X |

Primary Examiner—Philip C. Kannan
Attorney, Agent, or Firm—Wigman & Cohen

[57] ABSTRACT

A belt retention clip for engaging the waistband of a garment, said clip comprising a base portion, an outwardly and downwardly depending arm positioned adjacent said base portion and adapted to engage the waistband of the garment therebetween and an outwardly and upwardly extending arm positioned adjacent said base portion and adapted to receive the belt therebetween, said first-mentioned arm and/or base portion being profiled or provided with means which, in use, retain the clip on the garment waistband.

7 Claims, 6 Drawing Figures

BELT RETENTION MEANS FOR GARMENTS

REFERENCE TO RELATED APPLICATION

This application is a continuation of Ser. No. 908,771, filed May 23, 1978, now abandoned.

BACKGROUND OF THE INVENTION

Field of the Invention

The present invention relates to a belt retention clip for garments such as skirts, trousers, or shorts, which clip is adapted to be fitted to the waistband of such garments for retaining a belt in position around the waist of a wearer.

SUMMARY OF THE INVENTION

At the present time, a plurality of cloth loops are attached to the waistband of a garment in order to retain a belt in position therearound and, as is well known, the stitching of individual loops at both ends is time-consuming and furthermore, such loops are unsightly if the user wishes to use the garment without a belt.

Thus, the object of the present invention is to overcome the disadvantages referred to above by providing a belt retention clip which can be readily positioned on, and removed from, the waistband of a garment.

It is to be understood that throughout the following description such terms as "upper", "upwardly" and "downwardly" are used for convenience to refer to the orientations of the belt retention means relative to its normal vertical position when in use on the waistband of a garment.

The present invention consists of a belt retention clip for engaging the waistband of a garment, said clip comprising a base portion, an outwardly and downwardly extending arm positioned adjacent said base portion and adapted to engage the waistband of the garment therebetween and an outwardly and upwardly extending arm positioned adjacent said base portion and adapted to receive the belt therebetween, said first-mentioned arm and/or base portion being profiled or provided with means which, in use, retain the clip on the garment waistband.

DETAILED DESCRIPTION OF THE PREFERRED EMBODIMENT

Figure 1:
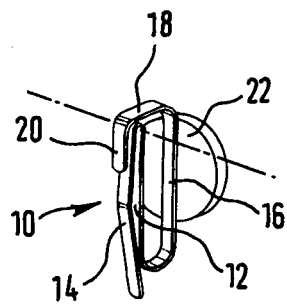
FIG. 1 is a perspective view of a belt retention clip according to the present invention.

In carrying the invention into effect according to one convenient mode, by way of example, the belt-retaining means comprises a clip 10 formed of springy plastic material or metal and of generally sinusoidal form, i.e., having a base portion 12 one end of which has an integral outwardly and downwardly extending arm 14, whilst the other end of the base portion 10 has an integral outwardly and upwardly extending arm 16. The waistband of the garment is adpated to be received between the base portion 12 and arm 14, whilst the belt is adapted to be accommodated between the base portion 12 and arm 16. The upper extremity of the latter arm is provided with an inwardly extending portion 18 which inhibits removal of the belt from the clip 10 and a downwardly extending abutment portion 20 which engages the arm 14 to inhibit distortion of the clip when in use. Suitable ornamentation, such as an ornamental disc 22 is fixedly mounted on the front surface of the arm 16.

Figure 2:
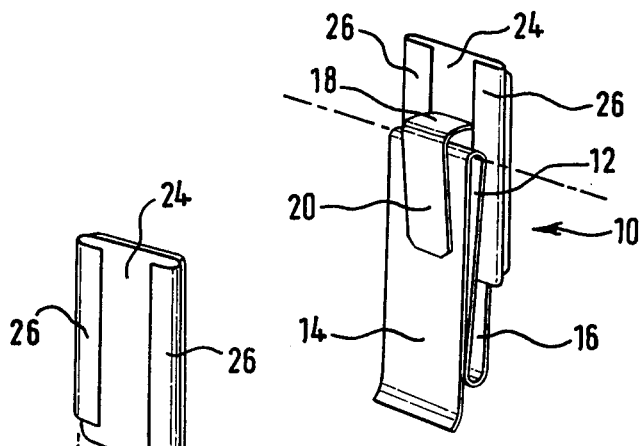
FIG. 2 is a perspective view similar to FIG. 1, showing another form of clip according to the present invention.

FIG. 2 is a modification of the clip 10 shown in FIG. 1 and like parts are indicated by like reference numerals. The basic difference is that the clip is formed from a strip material of greater width than the material shown in FIG. 1. In this modification, the upper end of the upwardly extending arm 16 is stepped at each side to provide a shoulder so that the inwardly extending portion 18 and abutment portion 20 are of reduced width.

This arrangement enables an ornamental cover 24 having inwardly turned side flanges 26 to be slid downwardly over the arm 16 to cover same. It will be appreciated that as the cover 24 is easily removable, other covers bearing different ornamentation may be used.

Figure 3:
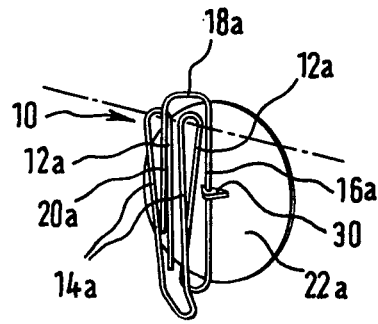
FIG. 3 is a perspective view similar to FIG. 2, showing a further form of clip according to the present invention.

The basic form of the clip shown in FIG. 3 is similar to that shown in FIG. 1, but is formed from a length of spring steel wire which is bent to form spaced coplanar wire portions 12a providing the base portion, spaced coplanar wire portions 14a providing the downwardly extending arm, a wire portion 16a providing the upwardly extending arm, the continuation of which provides the inwardly extending, and abutment portions 18a and 20a, respectively. In this arrangement, an ornamental disc 22a is provided with an apertured flange 30 extending normal to its rear surface which is "threaded" over the wire portions 20a and 18a onto the arm 16a where it rests on a soldered stop (not shown).

Figure 4:
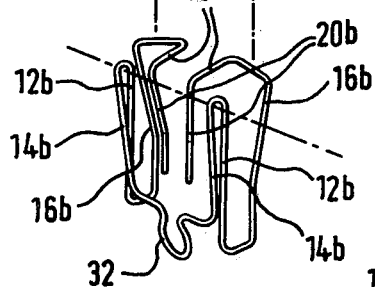
FIG. 4 is a perspective view of a still further form of clip according to the present invention showing a decorative cover removed.
Figure 5:
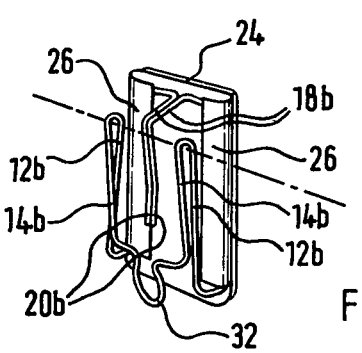
FIG. 5 is a view similar to FIG. 4, but showing the clip in assembled relationship with the cover.

The clip shown in FIGS. 4 and 5 is also formed from a length of spring steel wire which is bent to form spaced coplanar wire portions 12b providing the base portion, spaced coplanar wire portions 14b which are interconnected by the centre portion 32 of the steel wire providing the downwardly extending arm, spaced coplanar wire portions 16b providing the upwardly extending arm, the continuation of each of which provides coplanar inwardly extending, and abutment portions 18b and 20b respectively.

In this arrangement, in order to mount the ornamental cover 24 on the clip as shown in FIG. 5, the spaced wire portions 16b are first urged towards each other and then the cover 24 is slid downwardly with the flanges 26 thereof gripping the wire portions 16b. It will be appreciated that the cover 24 is maintained in position on the wire portions 16b by the springiness of the material and that the outer surface of the cover 24 is made attractive to the eye by ornamentation or attachement of motifs.

Figure 6:
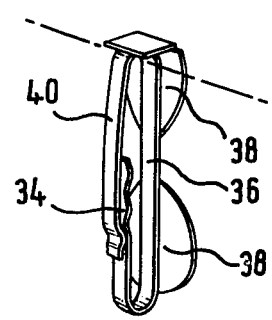
FIG. 6 is a perspective view showing another form of clip according to the present invention.

In the embodiment shown in FIG. 6, the clip 10 one end of a length of spring strip comprises a base portion 34, the lower end of which is bent to form an outwardly and upwardly extending arm 36 bearing ornamental motifs 38. The upper end of the arm 36 is bent to form an inwardly and downwardly extending arm 40 which overlies the base portion 34. The waistband of the garment is adapted to be received between the base portion 34 and the downwardly extending arm 40, whilst the belt is adapted to be accommodated between the base portion 34 and the upwardly extending arm 36.

In all of the above described embodiments, the downwardly extending arm and/or adjacent base portion may be profiled to ensure a firm gripping action on the garment waistband or, alternatively, the inner surface of the downwardly extending arm and/or the adjacent surface of the base portion may be provided with formations such as protuberances, teeth, or prongs, which in use, grip the garment waistband to prevent the ready displacement, or removal of the clip. In a modified arrangement, the downwardly extending arm may be apertured which enables the clip to be sewn onto the garment waistband for the same purpose.

The length of the clips may vary from ½ to 4½ inches in order to accommodate various widths of belt and are preferably coloured to match the belt material. In use, a plurality of clips are spaced around the garment waistband and are readily removed therefrom either by sliding thin plates of plastic material up both gripping surfaces of the clip, or merely cutting the stitching in the case of the modified arrangement referred to above.

I claim:

1. A belt retention clip for engaging the waistband of a garment, said clip comprising:
   a base portion,
   an outwardly and downwardly depending arm positioned adjacent said base portion and adapted to engage the waistband of the garment therebetween, and
   an outwardly and upwardly extending arm positioned adjacent said base portion and adapted to receive the belt therebetween,
   said first-mentioned arm and base portion being provided with means for retaining the clip on the garment waistband,
   said outwardly and upwardly extending arm being provided with an ornamental member,
   said ornamental member having inwardly turned side flange means for sliding said ornamental member on and removing said ornamental member from the outwardly and upwardly extending arm,
   wherein the upper end of said outwardly and upwardly extending arm terminates in an inwardly extending portion and a downwardly extending abutment portion, the latter engaging said outwardly and downwardly extending arm.

2. A belt retention clip as claimed in claim 1, wherein said clip is formed from strip material bent into a generally sinusoidal form, one end of said base portion terminating in said outwardly and downwardly extending arm, whilst the other end thereof terminates in said outwardly and upwardly extending arm.

3. A belt retention clip as claimed in claim 1, wherein said clip is formed from strip material, the lower end of said base portion terminating in said outwardly and upwardly extending arm, and the upper end of said base portion terminating in said outwardly and downwardly extending arm.

4. A belt retention clip for engaging the waistband of a garment, said clip comprising:
   a base portion,
   an outwardly and downwardly depending arm positioned adjacent said base portion and adapted to engage the waistband of the garment therebetween, and
   an outwardly and upwardly extending arm positioned adjacent said base portion and adapted to receive the belt therebetween,
   said first-mentiond arm and base portion being provided with means for retaining the clip on the garment waistband,
   said outwardly and upwardly extending arm being provided with an ornamental member,
   said ornamental member having inwardly turned side flange means for sliding said ornamental member on and removing said ornamental member from the outwardly and upwardly extending arm,
   said outwardly and upwardly extending arm having its upper ends terminate in inwardly extending portions and downwardly extending abutment portions, the latter engaging the waistband of the garment.

5. A belt retention clip as claimed in claim 4, wherein said clip is formed from a length of wire bent into generally sinusoidal form, the base portion, the outwardly and downwardly extending arm, and the outwardly and upwardly extending arm, being, respectively, formed by spaced coplanar wire portions.

6. A belt retention clip as claimed in claim 5, wherein said ornamental member is a cover member mounted on the spaced coplanar wire portions forming said outwardly and upwardly extending arm.

7. A belt retention clip as claimed in claim 6, wherein the cover member is maintained in position on the spaced coplanar wire portions by the springiness of the latter.

* * * * *